(12) United States Patent
Lei et al.

(10) Patent No.: US 7,706,785 B2
(45) Date of Patent: Apr. 27, 2010

(54) SYSTEM AND METHOD FOR CONTEXT-AWARE UNIFIED COMMUNICATIONS

(75) Inventors: Hui Lei, Scarsdale, NY (US); Anand Ranganathan, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 10/349,235

(22) Filed: Jan. 22, 2003

(65) Prior Publication Data

US 2004/0203664 A1    Oct. 14, 2004

(51) Int. Cl.
    *H04L 29/08* (2006.01)
(52) U.S. Cl. ............... 455/414.4; 370/352; 709/227
(58) Field of Classification Search ............. 455/414, 455/414.1, 560, 414.4; 709/227
    See application file for complete search history.

(56) References Cited

U.S. PATENT DOCUMENTS

| | | | | |
|---|---|---|---|---|
| 6,975,719 | B1 * | 12/2005 | Gao et al. | 379/265.09 |
| 2002/0097692 | A1 * | 7/2002 | Ruotoistenmaki | 370/328 |
| 2003/0005126 | A1 * | 1/2003 | Schwartz et al. | 709/227 |
| 2003/0185375 | A1 * | 10/2003 | Albal | 379/220.01 |
| 2003/0191676 | A1 * | 10/2003 | Templeton | 705/8 |
| 2004/0017788 | A1 * | 1/2004 | Shmueli et al. | 370/328 |
| 2004/0072593 | A1 * | 4/2004 | Robbins et al. | 455/560 |
| 2004/0086100 | A1 * | 5/2004 | Moore et al. | 379/201.01 |

* cited by examiner

*Primary Examiner*—Patrick N Edouard
*Assistant Examiner*—Chuck Huynh
(74) *Attorney, Agent, or Firm*—Scully, Scott, Murphy & Presser, P.C.; Anne Dougherty, Esq.

(57) ABSTRACT

A system and method for context-aware unified communication for enabling communications between users over a common communications platform or heterogeneous communications platforms. The system comprises: agents associated with a respective caller and callee communications device for generating commands providing call control between the caller and callee devices; a routing engine for routing call commands between caller and callee via respective device agents to establish a communication session, and enabling exchange of conversation messages between the caller and callee communications devices over said single or heterogeneous communications platforms; a device for monitoring dynamic context of a callee and obtaining callee's preferences for receiving communications so that the routing engine enables a call setup between a caller and callee communications devices based on the callee's preferences or dynamic context information; and, further enabling either caller or callee to migrate a call to another communications device without disrupting a flow of a conversation.

30 Claims, 8 Drawing Sheets

SYSTEM AND METHOD FOR CONTEXT-AWARE UNIFIED COMMUNICATIONS

BACKGROUND OF THE INVENTION

1. Field of the Invention

The present invention relates generally to context-aware applications for computer systems, and more particularly to a novel unified communication system that automatically manages both two-way and one-way human communication across heterogeneous and arbitrary communications devices.

2. Description of the Prior Art

Modern man is part of a highly connected communication network. He can be reached through a wide variety of communication mechanisms. Communication between people can take place through e-mail, instant messaging, cellular phone, landline phone, Short Message Service (SMS), voicemail, pager etc. Each means of communication has its own sets of features and drawbacks. Although a person typically has multiple communication devices (a "device" as referred to and understood herein representing a broad range of hardware entities like phones, pagers, etc. or software entities like instant messaging clients, e-mail clients, etc.), that person may have access to only a subset of them at a particular time. Depending on that person's situation, he/she may also have a preference on which of the available devices to use. For example, a person may prefer chatting with somebody using an instant messaging (IM) client when he/she is working on something else or, in the middle of a meeting. But when the meeting is over or if that person has to leave the room, he/she may want to continue chatting with the other party on his/her cell phone or via short messaging service. Hence, a unified communication system that allows a person to communicate using the most convenient device at the time will enhance user experience and offer more opportunities for collaboration.

Although there are already systems that dispatch messages to a person on an appropriate device (for example, as described in the reference to M. Roussopoulos, P. Maniatis, E. Swierk, K. Lai, G. Appenzeller and M. Baker entitled "Personal-level Routing in the Mobile People Architecture", *Proceedings of the USENIX Symposium on Internet Technologies and Systems*, October 1999; and, in the reference to B. Raman, R. Katz, and A. Joseph entitled "Universal Inbox: Providing Extensible Personal Mobility and Service Mobility in an Integrated Communication Network", *Proceedings of the Third IEEE Workshop on Mobile Computing Systems and Applications*, Monterey, Calif., December 2000; and in the reference to H. Lei, D. Sow, J. Davis II, G. Banaduth and M. Ebling in a reference entitled "The Design and Applications of a Context Service" *ACM Mobile Computing and Communications Review (MC2R)*, October 2002), they are effectively unified one-way messaging systems that allow sending a single message at a time. The inherent differences between two-way communication (i.e., conversation) and one-way messaging (i.e., notification) introduce new issues and challenges in the design of a unified two-way communication system. First, one-way messaging is asynchronous in that there may be arbitrary time lapse between the sending and receiving of a message. In comparison, two-way communication is synchronous: both parties must be present in order for a conversation to take place. Thus, two-way communication requires proper call setup. Call setup alerts the callee and obtains her acceptance for the call. It further involves negotiation between the devices on communication media. Second, while one-way messaging is stateless, two-way communication consists of a sequence of exchanges and is stateful. Call state must be maintained for the entire duration of the call. Also, call migration from one device to another may be desirable and needs to be supported. Third, not all devices have native support for two-way communication. Nevertheless, it may still be useful to exploit one-way devices such as pagers and email to enhance two-way communication, as opposed to ignoring them.

A promising technology for unified two-way communication is the Session Initiation Protocol (SIP) such as described in the reference to M. Handley, H. Schulzrinne, E. Schooler and J. Rosenberg entitled "SIP: Session Initiation Protocol". Request for Comments 2543, Internet Engineering Task Force, March 1999, the whole contents and disclosure of which is incorporated by reference as if fully set forth herein. SIP is an application-layer control or signaling protocol for creating, modifying and terminating sessions with two or more participants. These sessions include Internet multimedia conferences, Internet telephone calls, multimedia distribution, and instant messaging. However, SIP only provides a mechanism for managing calls. It does not specify what policies should be used for call management or how the policies should be enforced. It is obviously impractical to expect users to manually and constantly control all the call aspects such as where to route a call and whether to migrate a call. Further, most existing communication devices are not yet SIP-enabled and therefore may not be directly plugged into the SIP framework.

Accordingly, a need exists for a unified communication system that automatically manages both two-way and one-way human communication across heterogeneous and arbitrary devices.

It would thus be highly desirable to provide a unified communication system that automatically manages both two-way and one-way human communication across heterogeneous and arbitrary devices.

SUMMARY OF THE INVENTION

It is an object of the invention to provide a unified communication system that automatically manages both two-way and one-way human communication across heterogeneous and arbitrary devices.

It is a further object of the invention to provide a unified communication system that automatically manages the integration of heterogeneous communication endpoints for unified communication therebetween.

According to a preferred embodiment of the invention, there is provided a method for context-aware unified communication and a context-aware communication system for enabling communications between users over a common communications platform or heterogeneous communications platforms, the system comprising:

device agent means associated with a respective caller and callee communications device for generating commands for providing call control between caller and callee communications devices;

routing engine means for routing call commands between caller and callee via respective device agents to establish a communication session between caller and callee communications devices, and enabling exchange of conversation messages between said caller and callee communications devices over said single or heterogeneous communications platforms;

means for monitoring dynamic context of a callee and obtaining callee's preferences for receiving communications, said routing engine enabling a call setup between a caller and callee communications devices based on the callee's preferences or dynamic context information; and, means enabling either caller or callee to migrate a call to another communications device without disrupting a flow of a conversation therebetween, whereby said system enables communication of conversation messages between heterogeneous caller and callee devices in accordance with the most appropriate communications device.

Thus, according to the invention, a caller is able to initiate a communication with another party using any device available and the callee party is able to be contacted using the most appropriate device. Communicating parties may also switch to a different device during a conversation. In a preferred embodiment, communication sessions are automatically managed in a manner sensitive to user context. A user is able to specify call routing and migration preferences in terms of that user's context condition. The system and method manage calls on the user's behalf, relying on an infrastructure context service to retrieve and monitor the user's context.

According to another aspect of the invention, a person is able to receive notification of other parties' unified reachability status. In addition, a person is able to be alerted of an in-coming call from one of the person's one-way devices.

According to a further aspect of the invention, the system and method for context-aware unified communication protects user privacy by preventing the communication devices a person is connected to or the device the person is using for a particular communication from being revealed. Further, a person is able to prioritize and filter calls based on call attributes and user context.

BRIEF DESCRIPTION OF THE FIGURES

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
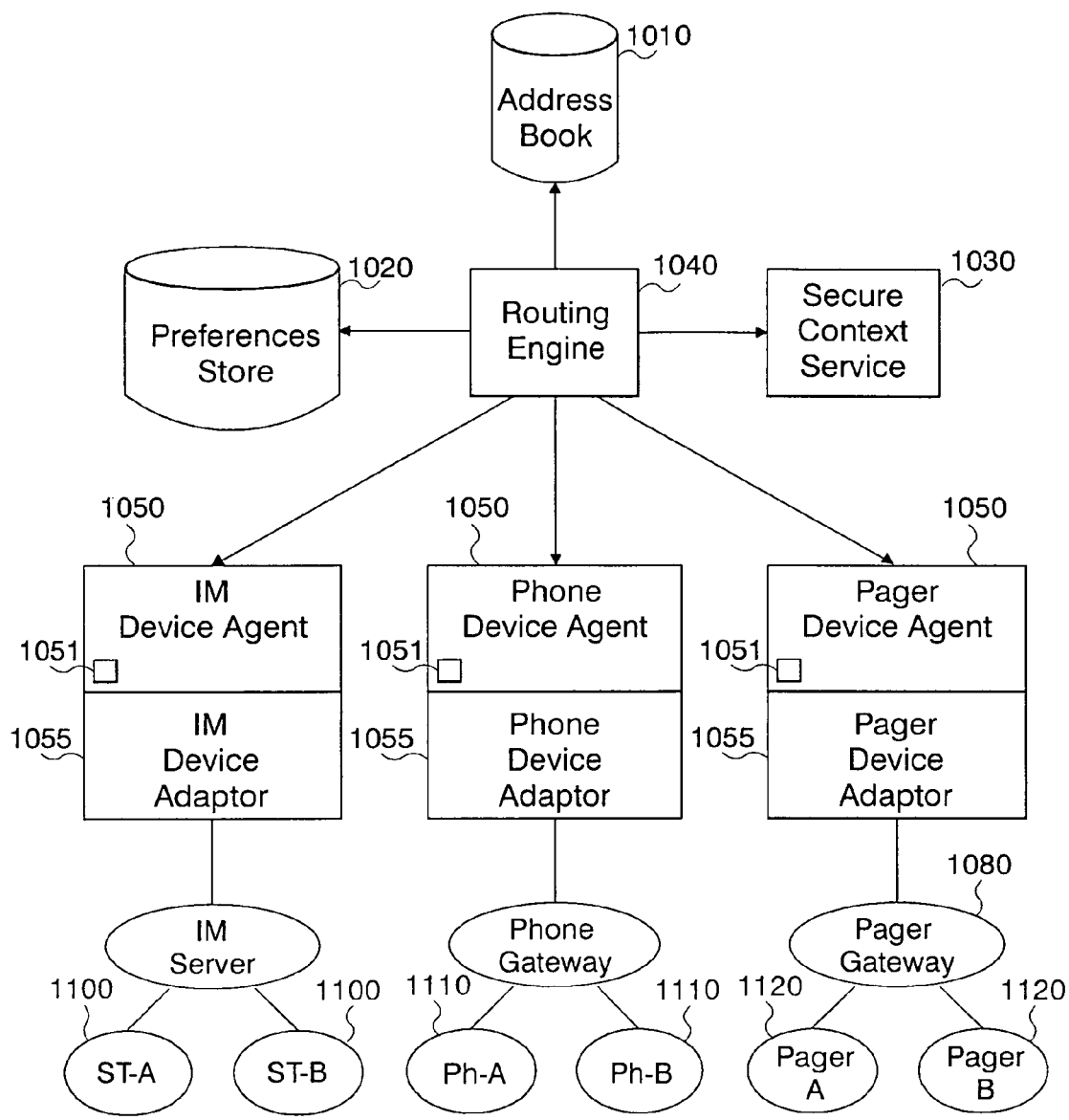
FIG. 1 is a block diagram of an overall system architecture in which the present invention can operate, formed in accordance with one embodiment of the present invention.

The present invention may be more fully understood with reference to FIG. 1, which shows an overall system architecture in which a preferred embodiment of the invention can operate. The components of FIG. 1 include a Routing Engine 1040 and a collection of Device Agents 1050. The Routing Engine 1040 is operatively coupled with an Address Book 1010, a Preferences Store 1020 and the Secure Context Service 1030. Each Device Agent 1050 has a device-specific layer called the Device Adaptor 1055. Depending on the type of device, each Device Agent 1050 interacts with a device-specific gateway through the Device Adaptor 1055. The device-specific gateway may be an Instant Messaging Server 1060, a Phone Gateway 1070, a Pager Gateway 1080 or any other type of gateway. Each gateway serves a number of individual devices. For example, the Instant Messaging Server 1060 serves instant messaging clients 1100; the Phone Gateway 1070 serves phones 1110; and the Pager Gateway 1080 serves pagers 1120. The components may be readily reconfigured, including moving various components to different computers. Given the teachings of the present invention provided herein, and the teachings of commonly-owned, co-pending U.S. patent application Ser. No. 10/198,283 entitled "Method and Apparatus for Providing a Flexible and Scalable Context Service", the contents and disclosure of which is incorporated by reference as if fully set forth herein, one of ordinary skill in the related art will contemplate these and various other configurations.

The individual devices 1100, 1110, and 1120 serve as the interface between a human user and the computing system. These devices 1100, 1110, 1120 are standard devices (instant messaging clients, phones, pagers, email clients, cell-phones, SMS phones etc.) and do not require any special modification for their use in the system. The devices 1100, 1110, 1120 accept commands from the user. A user command may be one of the following:

Place a call. The callee is identified by either a globally unique ID (GUID) or a device-specific address. The use of device-specific address is simply for caller's convenience and does not mandate the use of that device. For example, if the caller is using a telephone, it may be easier to enter the callee's telephone number instead of some other alphanumeric ID. The two parties can communicate with each other using different devices, e.g. one party may use a cellphone while the other may use instant messaging.

Transfer a call. Either party in a call can switch from using one device to another without disrupting the flow of conversation. For example, a user may be conversing with another party via a cell phone while driving, but may arrive at home and then transfer to a land-line phone device. This may take place in a manner transparent to the other party on the call, who may be using a completely different kind of device, for example, instant messaging client.

Terminate a call. Either party in a call may close the session at any time.

Send a message. A user may send a one-way message to another person. Both one-way and two-way devices of the receiver's would be considered for delivering the message.

Specify reachability. A user can indicate what devices he may be reached at by marking one or more of his devices as active or inactive.

Subscribe for reachability information. Users can subscribe for a particular person's availability information so that they can be notified when the person is reachable.

The human user enters commands through the native interface of the device 1100, 1110, 1120. The individual devices 1100, 1110, 1120 pass on the requests to the Device Agent 1050 through the appropriate gateway 1060, 1070, 1080. Each Device Agent 1050 has a well-known address on the access network served by the gateway 1060, 1070, 1080.

Device agents 1050 allow disparate devices to be integrated into the unified communication framework. They are addressable SIP entities and are capable of originating and terminating SIP requests. Each Device Agent 1050 handles one type of communication devices and acts as an access point for those devices.

A Device Agent 1050 performs three kinds of functions. First, it interacts with devices of a particular type. The Device Agent 1050 initiates and terminates calls on the devices. It accepts control and conversation messages from the devices, and sends response messages to the devices. Second, the Device Agent 1050 implements a SIP user agent. It constructs SIP messages (including presence messages in extended SIP) and sends them to SIP entities such as the Routing engine and other Device Agents 1050. It also listens for various SIP-related messages and events. Third, the Device Agent 1050 relays conversation messages to and from other Device Agents 1050. If necessary, it also translates those messages into different modalities or languages.

A Device Agent 1050 consists of a device-independent component, called the agent core, and a device-specific component, i.e., the Device Adapter 1055. The agent core handles interaction with the Routing Engine and other Device Agents 1050, whereas the Device Adapter 1050 handles interaction with devices 1100, 1110, 1120. The interaction between the agent core 1050 and the Device Adapter 1055 is through standard interfaces. Specifically, Device Adapters 1055 across all Device Agents implement a uniform adapter interface so that the agent core 1050 components may interact with them in a device-neutral manner. Another programmatic interface abstracts the user-related functionality of the Device Agent 1050, to which the Device Adapter 1055 maps user input.

The Routing Engine 1040 is essentially a SIP server. It forwards call requests to appropriate Device Agents 1050. It monitors user context during a call and, if necessary, prompts the user to transfer the call to another device 1100, 1110, 1120. It accesses an Address Book 1010 to map between a user's globally unique ID and various device-specific addresses. In addition, the engine 1040 accepts registration of and subscription for presence information, and sends notification of reachability. The presence capability of the Routing Engine 1040 builds upon the functionality of an external Secure Context Service 1030.

The Routing Engine 1040 makes call routing and migration decisions based on individual users' preferences. A user's preferences are expressed as a set of rules. Each rule specifies the devices that may be used under a particular condition. The rule condition is in terms of the callee's context variables (e.g., location, activity) and/or the attributes of the caller (e.g, caller ID, caller group). Each rule is optionally associated with a priority value to help resolving conflicts between rules.

Although the engine 1040 is shown as a single logical unit, it is understood that the engine functionality may be physically replicated so that each engine instance services only a subset of the users. For example, an engine instance may be deployed for one administrative domain or, in the extreme case, for a single user. In this manner, the engine instance is exposed only to the preferences and context information of the users it services, resulting in better security and privacy. In addition, since the service load is divided among multiple engine instances, the system will scale better.

The Secure Context Service 1030 allows the Routing Engine 1040 to obtain user context information without having to worry about the details of context derivation and context management. The Context Service 1030 API (Application Program Interface) includes both synchronous query and asynchronous callback functions. It is also very easy to incorporate new types of context data into the context service. Information currently provided by the context service includes instant messaging online status, activities and contact means derived from calendar entries, desktop activities, as well as user location reported from a variety of sources such as cellular providers, wireless LANs, GPS devices, and RIM Blackberry™ (palm pilot devices).

In addition to providing user context information, the Context Service 1030 also provides the basis for the presence capability in Routing. In fact, reachability state may be considered as one type of context information and maintained by the context service. The context update and callback functions in the context service directly correspond to the REGISTER, SUBSCRIBE and NOTIFY features in SIP.

Figure 2A:
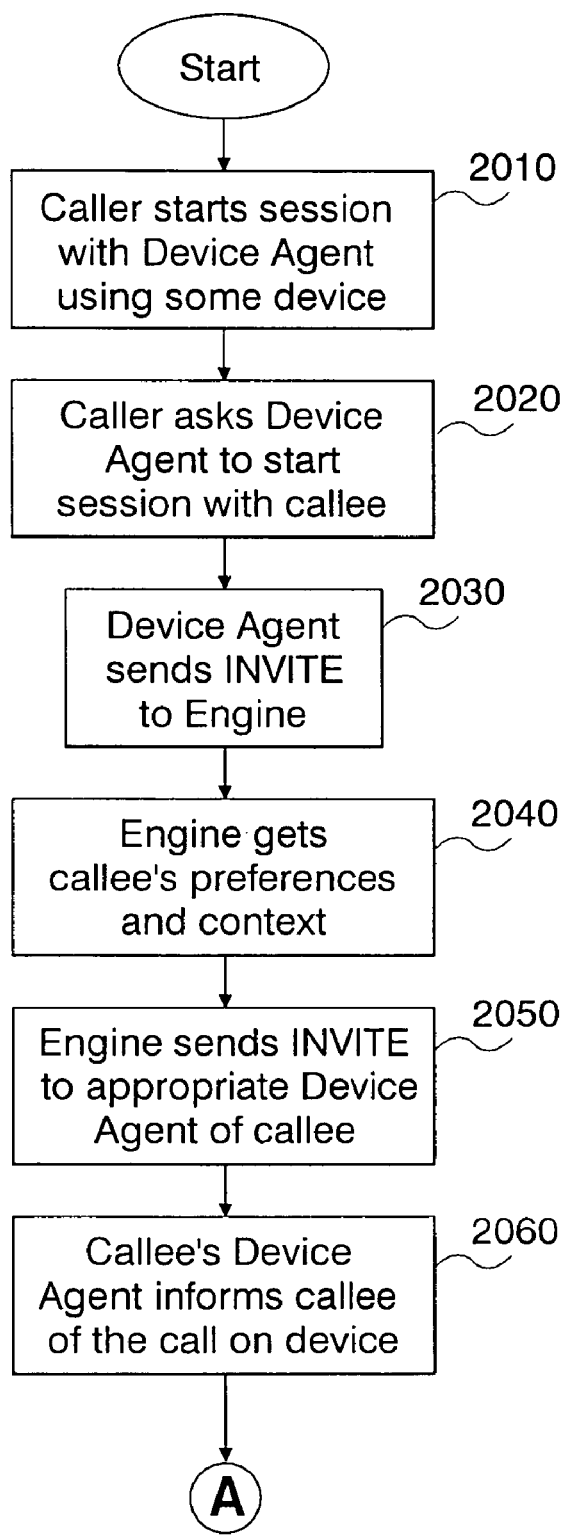
FIG. 2 is a diagram illustrating the sequence of events occurring in the creation of a call.
Figure 2B:
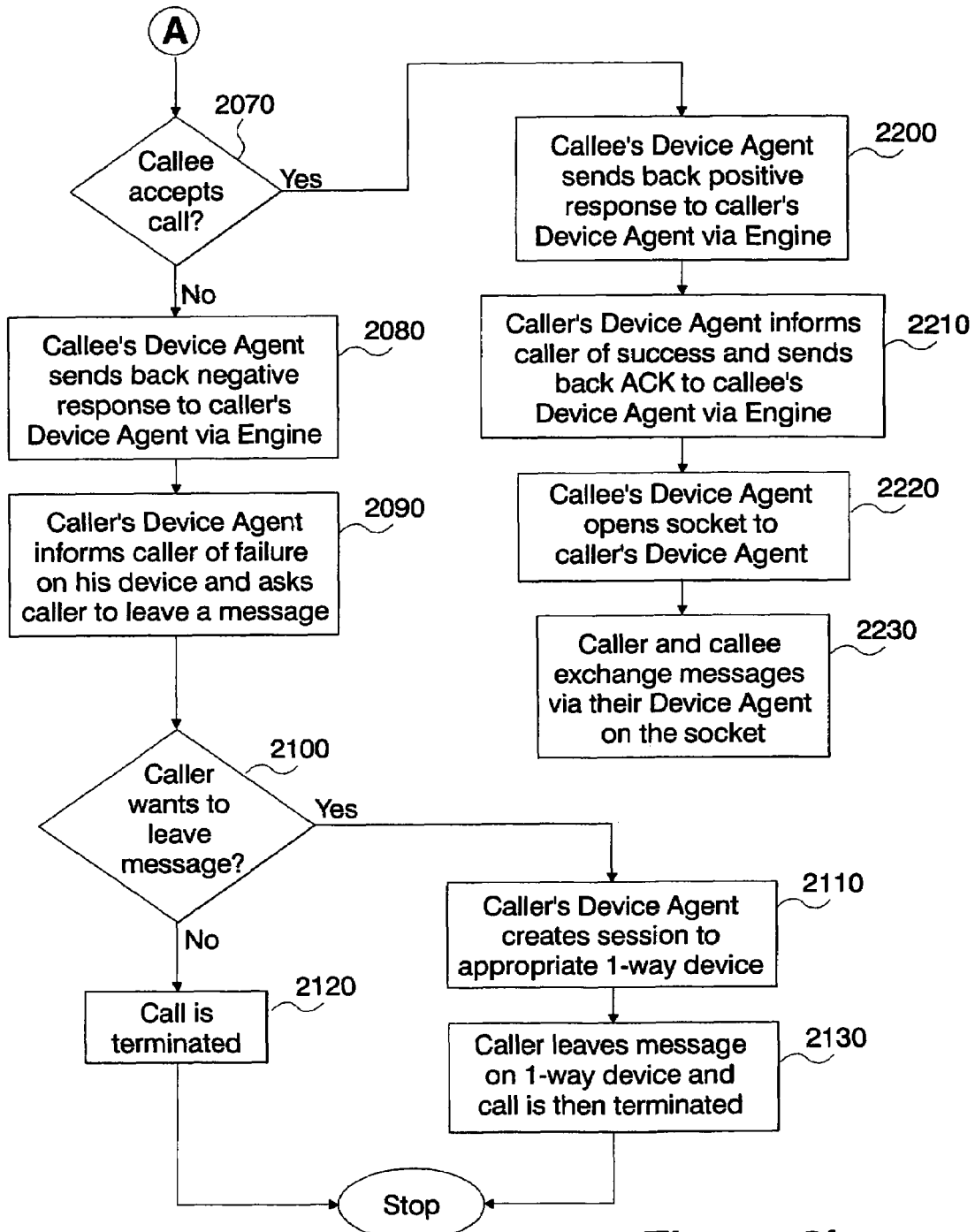

FIG. 2 illustrates the process by which a call is created. The caller may first pick up any device that is most suitable for the caller at the time. For example, the caller may use an instant messaging client if he/she is next to a computer or the caller may use his/her cell-phone if the caller is on the road. The caller calls the Device Agent 1050 first of the device 1100, 1110, 1120 he chooses to use (Step 2010). Using the native device interface, the caller asks the Device Agent 1050 to start a session with the callee (Step 2020). The Device Agent 1050 then sends a SIP INVITE request to the Routing Engine 1040 indicating the address of the other party (Step 2030). The Proxy finds the GUID of the callee, if necessary, by referring to the address book, looks up the preferences of the callee and based on the current context from the SCS (Step 2040), it sends a SIP INVITE to the appropriate Device Agent 1050 (Step 2050) which communicates with other device agents over, for example, an Internet communications backbone. The Device Agent 1050 receiving the INVITE indicates to the callee, through the device adapter, that he/she has an incoming call from the caller (Step 2060) and allows the callee to accept or reject the session (Step 2070). If the callee accepts the session, a positive response is sent back to the caller's Device Agent 1050 via the engine 1040 (Step 2200). The caller's Device Agent 1050 informs the caller of the successful call creation and sends back an ACK to the callee's Device Agent 1050 through the Routing Engine 1040, completing the 3-way handshake for creating a session (Step 2210). The callee's Device Agent 1050 then opens a communications socket, which may be a secure socket, to the caller's Device Agent 1050 (Step 2220) and messages are exchanged between the caller and the callee via the socket (Step 2230).

It should be understood that, with extra functionality built into the system, such as the integration of transcoders 1051 in the device agents and gateways to other communication devices (shown in FIG. 1), for example, users may communicate via heterogeneous devices. For example, a user may initiate a call over the cell phone for receipt by a caller as text (e.g., instant message). In this case, the transcoding functionality built into the device agent will convert text to audio and vice-versa, so that communication between users over different modalities is enabled.

Referring back to FIG. 2, if the callee rejects the session (Step 2070), a negative response is sent back to the caller's Device Agent 1050 via the engine 1040 (Step 2080). The caller's Device Agent 1050 informs the caller of the failure in creating the session and asks the caller whether he would like to leave a message (2090). If the caller so chooses (Step 2100), the Device Agent 1050 then starts a one-way session with one of the callee's one-way devices (Step 2110). After the caller leaves the message, the call is terminated (Step 2130). Otherwise, the caller may wish to terminate the call without leaving a message (Step 2120).

In a preferred embodiment, the caller's Device Agent's SIP INVITE request (Step 2050) may additionally indicate the data types (e.g., text, audio, etc.) the caller's Device Agent 1040 is able to support. The callee's Device Agent 1040 indicates the data type it prefers to receive in its response to the caller's Device Agent 1040. If the callee's Device Agent 1040 cannot understand or communicate via any of the caller's Device Agent's data types, it communicates back a negative response, indicating what data types it supports. The caller's Device Agent 1040 can then re-send the INVITE request if it is able to support any of the callee Device Agent's data types.

The most appropriate device for a user may change during a call. For example, a person, who uses a portable SMS device while walking to his office, may want to switch the conversation to a desktop instant messaging client once he enters his office. The system monitors a user's context and proactively prompts the user to switch to a more convenient device. The call flow for such a proactive call migration is shown in FIG. 3.

Figure 3:
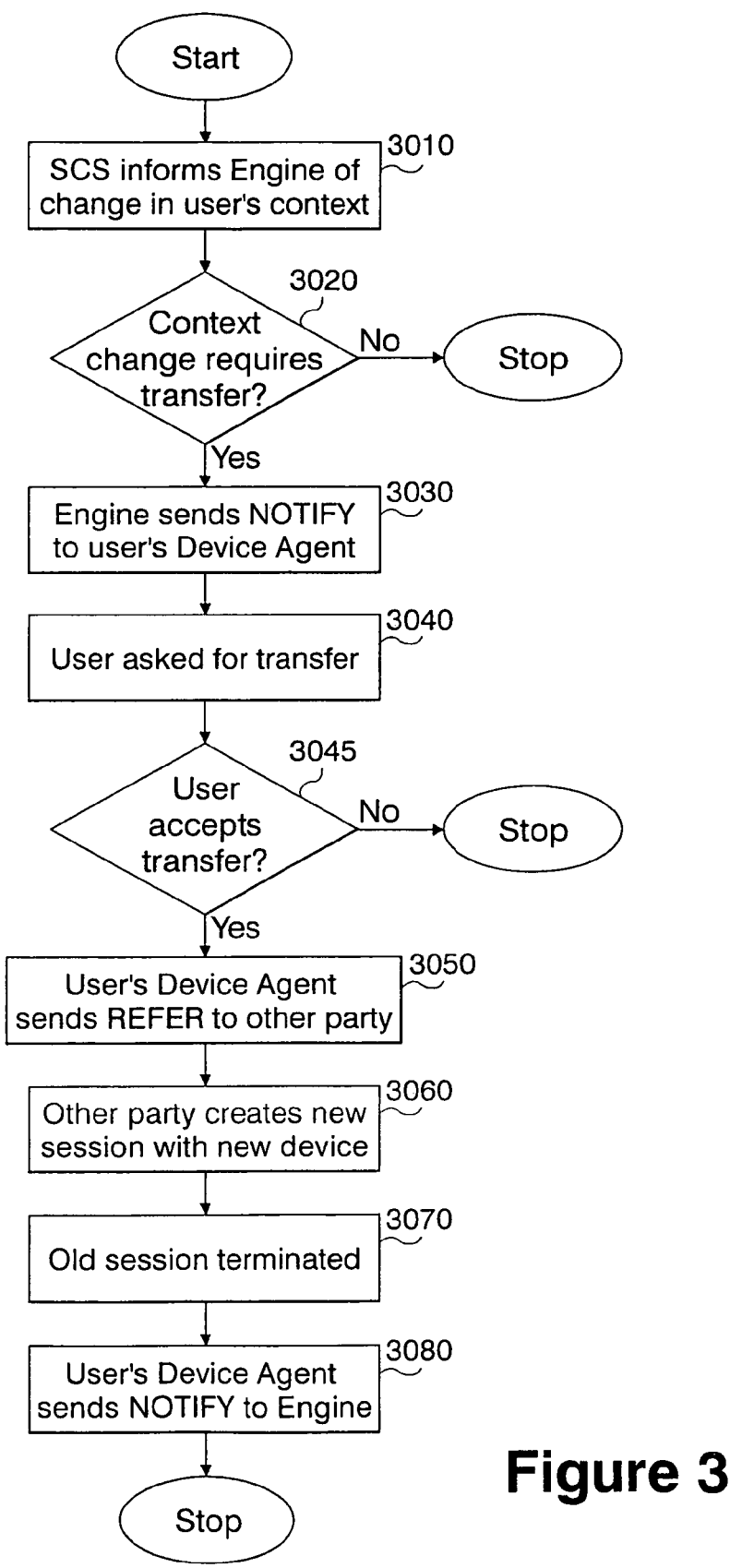
FIG. 3 is a diagram illustrating the sequence of events occurring in the termination of a call.

Referring to FIG. 3, when a call involving a user is first created, the Routing Engine 1040 creates subscriptions with the Secure Context Service 1030 for changes in the user's context. When changes occur, the Secure Context Service 1030 sends the Engine a callback (Step 3010). If the engine 1040 determines that the context change warrants a switch of user device (Step 3020), it sends a NOTIFY message to the Device Agent 1050 of that user (Step 3030). This NOTIFY message has the address of the new device to which the call should be transferred. The user is then asked on the device that he/she is using if he/she wants to migrate the call to the new device (Step 3040). If the user accepts the transfer (Step 3045), the Device Agent 1050 then sends a REFER message to the other party's Device Agent 1050 (Step 3050). The REFER request is a standard SIP message for transferring calls. It instructs the receiver to start a new session with the referred to address. Once the other party gets the REFER request, it sends an INVITE to the new device and starts a session with the new device using the standard SIP 3-way handshake (Step 3060) as described with reference to call creation described with respect to FIG. 2 (Steps 2010-2230). Once the new session is set up, the old session is terminated by the other party's Device Agent 1050 sending a BYE message to the user's old Device Agent 1050 (Step 3070), which then replies with a positive response. The old Device Agent 1050 also sends a NOTIFY to the proxy informing it of the successful call transfer (Step 3080).

In order for the Routing Engine 1040 to proactively recommend call migration, it must be aware of the state of each call. That is why the Device Agent 1050 sends it a NOTIFY message after a successful call migration (Step 3080 in FIG. 3) and after the call (old session) is terminated.

Call migration may also be initiated by the user explicitly specifying a new device. Manual call migration works in a similar way as a proactive migration. It follows Steps 3050-3080 as described with respect to FIG. 3.

Figure 4:
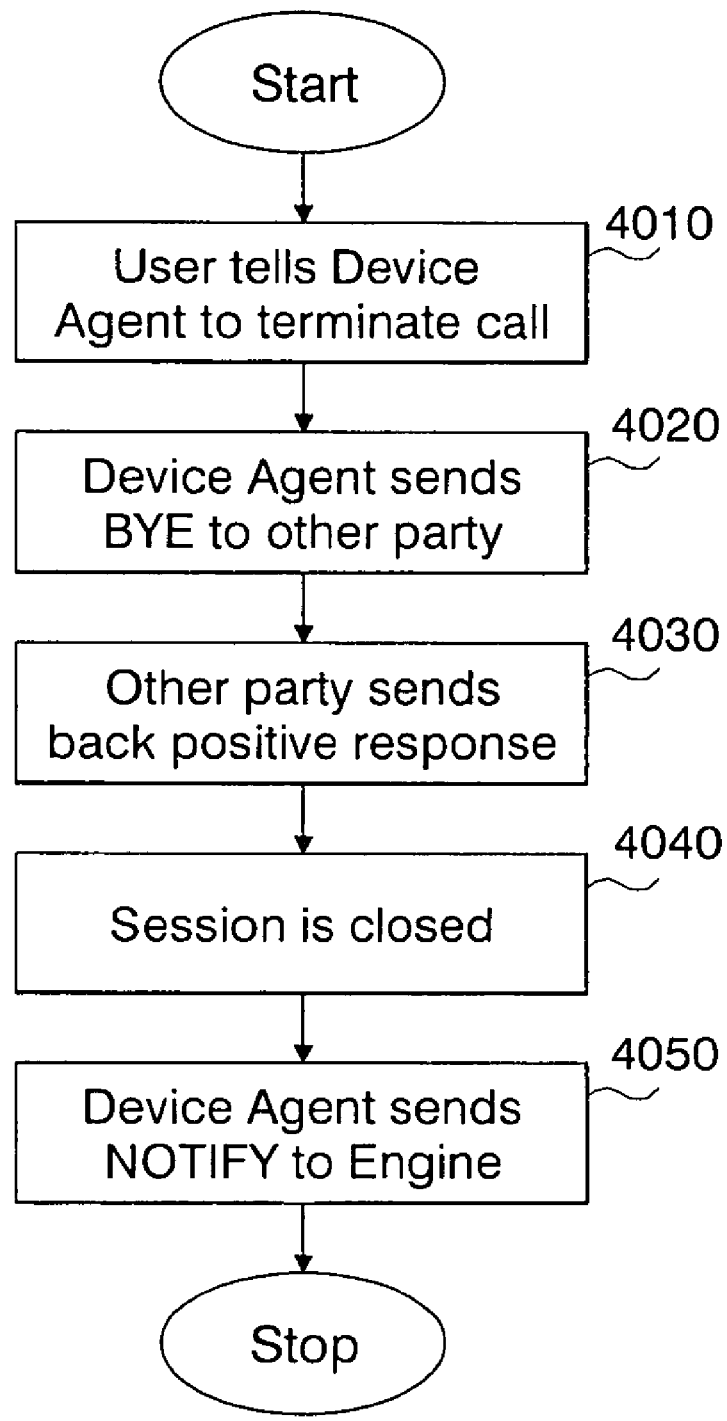
FIG. 4 is a diagram illustrating the sequence of events occurring in the migration of a call.

FIG. 4 illustrates the process by which a call is terminated. To terminate a call, the user indicates to the system that he wants to close the session (Step 4010). The Device-Agent 1050 then sends a BYE request to the other party (Step 4020). The other party sends a positive response to the BYE (Step 4030) and the session is closed (Step 4040). The Device Agent 1050 also sends a NOTIFY to the Routing Engine 1040 saying that the call is terminated, so that the Routing Engine 1040 is aware of the current state of the call (Step 4050).

A user can send a message to another user's one-way device. One-way messaging is treated as a special case of two-way communication. The choice of which one-way device to use is again made based on the context and the preferences of the intended receiver. A session is created between the sender's device 1100, 1110, 1120 and the receiver's one-way device 1100, 110, 1120, in the same way as for two-way devices. The Device Agents 1050 at either end can once again negotiate the data format of the messages. The only difference is that the Device Adaptor 1055 of the one-way device must buffer messages from the sender until the session is terminated by the sender. This is because the sender may be using a two-way device and thus may send multiple messages. Once the sender terminates the session, the Device Adaptor 1055 of the receiving device sends a single message to the intended receiver containing all messages from the sender.

It is possible that when a call request arrives at the Routing Engine 1040, the callee is not reachable through any two-way devices. For example, he may be away from his office phone, and is not running the instant messaging client. However, if he is still reachable through a one-way device, the callee may be alerted of the incoming call via the one-way device. Such a functionality is called soft ring.

If the callee desires to start a two-way session with the caller, he makes himself available on a two-way device. For instance, he can log into his instant messaging client, or go his office, or supply an alternative phone number to the system. The system then redirects the call to this two-way device.

Figure 5:
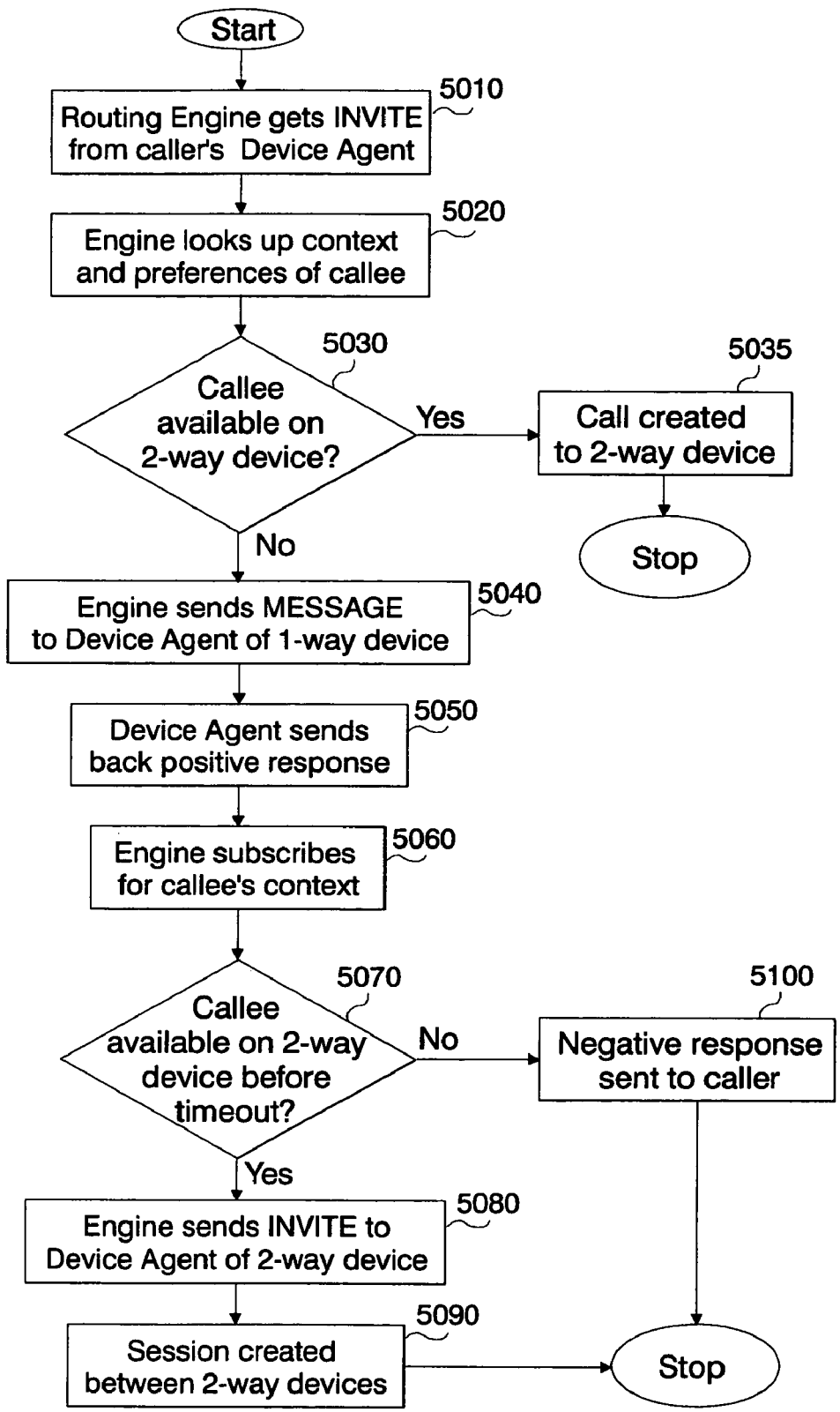
FIG. 5 is a diagram illustrating the sequence of events occurring in a soft ring.

The call flow for soft ring is shown in FIG. 5. Once the Routing Engine 1040 gets an INVITE request from a caller (Step 5010), it looks at the preferences and the context of the callee to select an appropriate two-way device. (Step 5020). If the callee is available on a 2-way device (Step 5030), the call is set up as before (Step 5035). If no two-way device is available but the use of a one-way device is allowed by the user preferences, the engine sends a MESSAGE request to the device agent of the one-way device (Step 5040). This MESSAGE request contains information on the incoming call. The Device Agent 1050 sends back a positive response to the engine if the message was delivered successfully (Step 5050). The Routing Engine 1040 then subscribes with the context service for the callee's connectivity through a two-way device (Step 5060). The subscription has a expiration time. So, now if the callee becomes available on one of the two-way devices (Step 5070), the engine 1040 is notified (Step 5080). The engine 1040 then forwards the original INIVTE request to the Device Agent 1050 of the two-way device (Step 5080) and the session is set up between the caller and the callee as before (Steps 5090). All these actions taking place at the callee's end is not visible to the caller. The caller just sees that the session is set up finally. If the callee does not make himself available within the timeout period, the Proxy just sends a negative response to the caller saying that the callee could not be reached (Step 5100).

Figure 6:
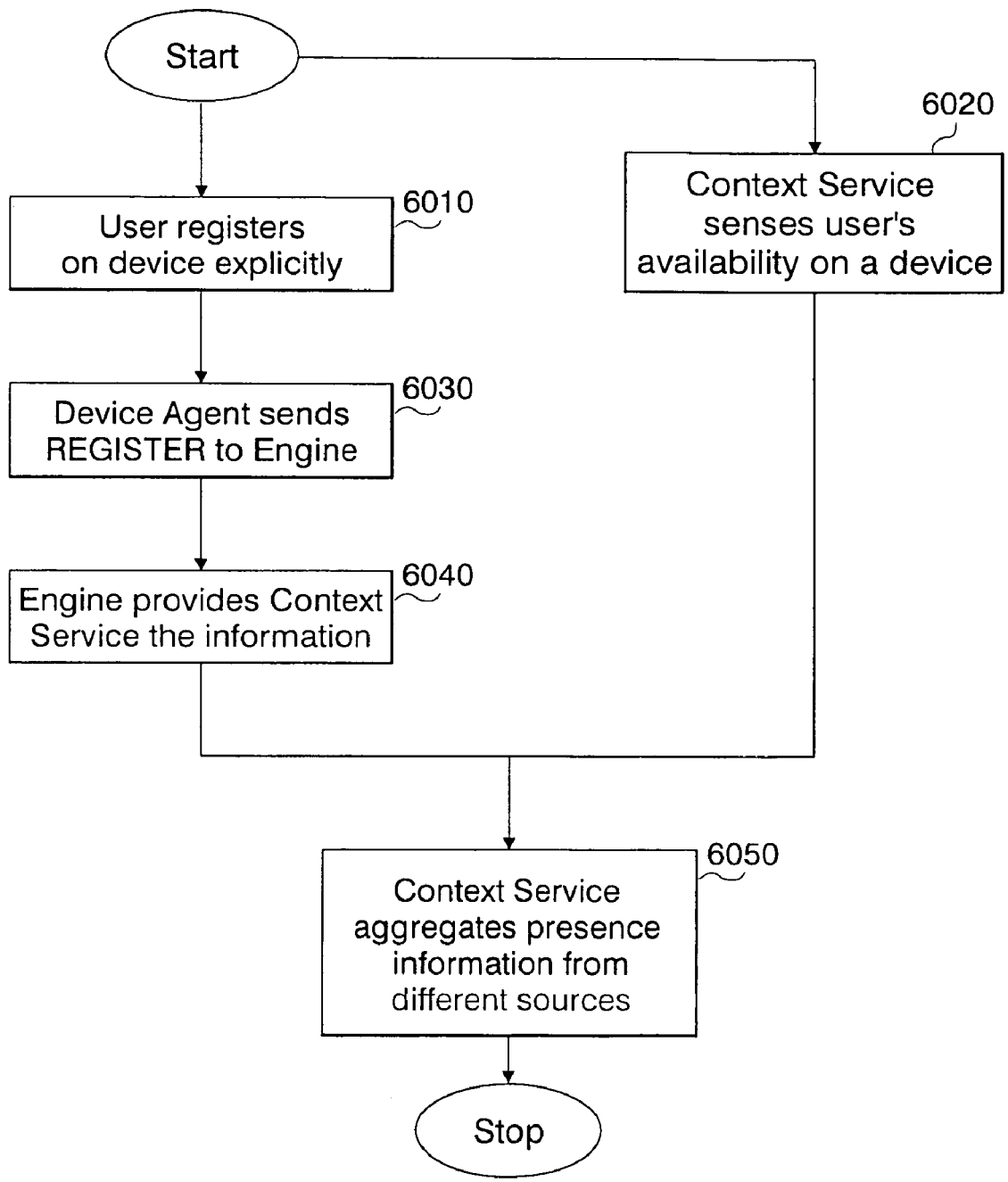
FIG. 6 is a diagram illustrating how the context service learns about the availability of users in different devices.

As mentioned earlier, the presence capability builds upon the functionality of the context service 1030. FIG. 6 show describes how the context service learns about the availability of users in different devices. When a user specifies her reachability with a Device Agent 1050 (Step 6010), the Device Agent 1050 forwards the information to the Routing engine 1040 via a REGISTER message (Step 6030). The engine 1040 then pushes the information to the context service as a context update. (Step 6040). The context service 1030 can also sense the availability of users on different devices without any explicit action from the user. For example, it may make use of location information about the user to know which devices the user can use.

Figure 7:
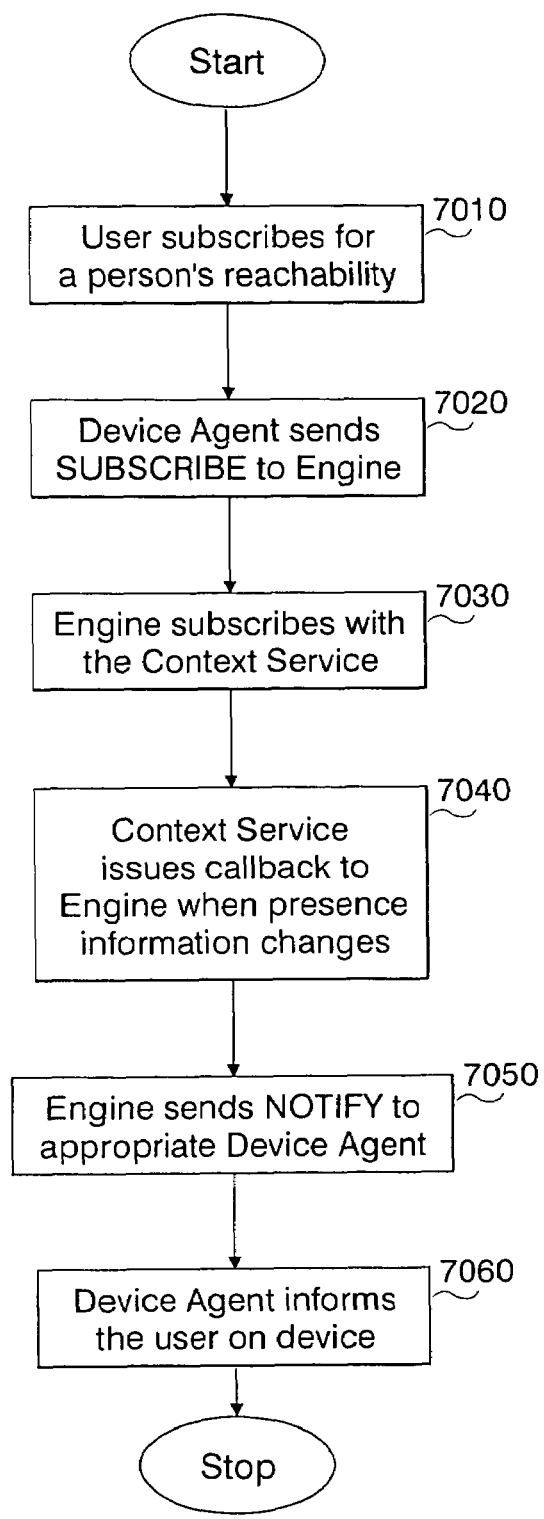
FIG. 7 is a diagram illustrating how users can be notified about changes in the presence information of other people.

FIG. 7 shows how users can be notified about changes in the presence information of other people. When a user requests for notifications about the presence of other people, a subscription for reachability is sent from the Device Agent 1050 to the engine 1040 via a SUBSCRIBE message (Step 7020), followed by a request for callback made by the engine 1040 to the context service 1030 (Step 7030). The subscription can be either for one-way reachability or two-way reachability. When the context service 1030 later issues a callback to the engine 1040 (Step 7040), the latter relays the callback to an appropriate Device Agent 1050s via a NOTIFY message (Step 7050). The Device Agent then informs the user on his device (Step 7060). The callback for a one-way subscription indicates that the person of interest is reachable via any one-way device, and the callback for a two-way subscription indicates that the person is reachable via any device.

The use of the context service for presence offers two advantages. First, the built-in support for context publication and subscription in the context service 1030 simplifies the logic of the Routing Engine 1040. More importantly, the context service is able to aggregate potentially conflicting context data from multiple sources. This allows user-asserted presence to be aggregated with automatically-sensed connectivity, providing unified reachability information and with better quality (Step 6050).

The description of the present invention has been presented for purposes of illustration and description, and is not intended to be exhaustive or limited to the invention in the form disclosed. Many modifications, variations and extensions will be apparent to those of ordinary skill in the art. All such modifications, variations and extensions are intended to be included within the scope of the invention as defined by the appended claims.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

The invention claimed is:

1. A context-aware communication system for enabling communications between users over a common communications platform or heterogeneous communications platforms, said system comprising:
   device agent means associated with a respective caller and callee communications device for generating commands for providing call control between caller and callee communications devices;
   routing engine means for routing call commands between caller and callee via respective device agents to establish a communication session between caller and callee communications devices, and enabling exchange of conversation messages between said caller and callee communications devices including at least heterogeneous devices over said single or heterogeneous communications platforms;
   means for monitoring dynamic context of a callee and obtaining callee's preferences for receiving communications, said routing engine enabling a call setup between a caller and callee communications devices based on the callee's preferences or dynamic context information; and,
   means for enabling either caller or callee to migrate, based on a change in location of the caller or callee, a call that is ongoing to another communications device including at least to different modalities of communications without disrupting a flow of a conversation therebetween, the different modalities including at least audio and text, said migrating being performed without affecting other party of the call who is not migrating,
   whereby said system enables communication of conversation messages between caller and callee devices in accordance with the most appropriate communications device,
       wherein a callee is able to specify a call routing preference, said routing engine further including a storage means for storing user preferences, and further including means for accessing a preference for determining routing of conversation messages to a preferred callee device, and wherein said routing engine further includes:
       registration means for enabling a user callee to specify reachability, wherein a call control command indicates what devices that a callee may be reached at; and,
       subscription means for enabling a user caller to receive notifications of a potential callee's availability to communicate and on what communications device.

2. The communication system as claimed in claim 1, further including a communications gateway associated with a communications platform for enabling device agent receipt of call requests from a communications device.

3. The context-aware communication system as claimed in claim 2, wherein call control commands include a command for initiating call placement to a callee, said callee being identified by one of a globally unique ID (GUID) or a device-specific address, said routing engine further comprising means for mapping between a user's unique ID for routing and communication device-specific addresses.

4. The context-aware communication system as claimed in claim 2, wherein a caller and callee device agent each initiates opening of a communications socket connection for exchange of conversation messages between the caller and the callee.

5. The context-aware communication system as claimed in claim 4, wherein a call control command includes one or more commands for initiating call transfer where a party can switch a call from using one communications device to another without disrupting a conversation flow, and a command for initiating a call termination.

6. The context-aware communication system as claimed in claim 4, wherein a call control command include one or more commands for initiating sending of a one-way message to a callee communications device, said one-way message alerting a callee of a call prior to a step of routing the call to the callee.

7. The context-aware communication system as claimed in claim 4, further comprising a transcoder means for adapting conversation messages received from a communications device according to a first platform type to messages for receipt by a communications device of a second platform type.

8. The context-aware communication system as claimed in claim 1, wherein said communications devices include client devices selected from a group comprising: devices for instant messaging, cellular phone, landline telephones, Short Message Service (SMS) phone, voice-mail, pagers, e-mail clients, cell-phones.

9. The context-aware communication system as claimed in claim 1, wherein said call control commands are communicated between device agents according to a signaling protocol.

10. The context-aware communication system as claimed in claim 9, wherein said signaling protocol is a Session Initiation Protocol (SIP), said routing engine comprising a server device for forwarding call request command initiated by a caller device agent to a callee device agent based on a callee's preference.

11. The context-aware communication system as claimed in claim 1, wherein said means enabling either caller or callee to migrate a call to another communications device includes enabling said routing engine to dynamically route control commands and conversation messages between caller and callee device agents based on user context information.

12. The context-aware communication system as claimed in claim 1, wherein a callee is able to specify call routing preferences in terms of a context condition, said means for monitoring callee's context interfacing with said routing engine for determining optimum routing of messages by said engine.

13. The context-aware communication system as claimed in claim 12, wherein a callee is able to specify call migration preferences in terms of a context condition, said routing engine initiating call migration whereby a caller or callee are able to switch to a different communications device during a single conversation.

14. The context-aware communication system as claimed in claim 12, wherein user context information includes one or more of: callee current activity, callee location, callee desktop activities, callee connectivity state, caller id and group id.

15. A method for context-aware unified communication between users over a common communications platform or heterogeneous communications platforms, said method comprising the steps of:
 a) generating call control commands for establishing a communications session between caller and callee communications devices over a single or heterogeneous communications platforms;
 b) routing conversation messages initiated by a caller between said caller and callee via respective caller and callee communications devices;
 c) monitoring dynamic context of a callee and obtaining callee's preferences for receiving communications, said routing of conversation messages being based on the callee's preferences or dynamic context information; and,
 d) enabling either caller or callee to migrate, based on a change in location of the caller or callee, a call that is ongoing to another communications device including at least to different modalities of communications without disrupting a flow of a conversation therebetween, the different modalities including at least audio and text, said migrating being performed without affecting other party of the call who is not migrating,
 whereby communication of conversation messages between caller and callee devices is enabled in accordance with the most appropriate communications device, the method further including the steps of:
  enabling a user to specify a call routing preference and storing said user preferences, said routing step b) further including the step of accessing a preference for determining routing of messages to a preferred callee device;
  enabling a user callee to specify reachability, wherein a call command indicates what devices that user may be reached at; and,
  enabling a user caller to receive notifications of a potential callee's availability to communicate and on what callee communications device.

16. The method for context-aware unified communication as claimed in claim 15, wherein said routing step (b) further includes the step of adapting conversation messages received from a communications device according to a first platform type to messages for receipt by a communications device of a second platform type.

17. The method as claimed in claim 15, further including the step of:
 enabling a user to specify a call routing preference in terms of a context condition, said routing step providing call routing feature for routing conversation messages dynamically between caller and callee in a manner sensitive to a callee's context.

18. The method as claimed in claim 17, further including: enabling a user to specify a call migration preference in terms of a context condition, said migrating step including the step of enabling a caller or callee to switch to a different communications device during a single conversation.

19. The method as claimed in claim 17, wherein user context information includes one or more of: callee current activity, callee location, callee desktop activities, callee connectivity state, caller id and group id.

20. The method as claimed in claim 15, wherein a call command includes a command for initiating call placement to a callee, said callee being identified by one of a globally unique ID (GUID) or a device-specific address, said routing step further comprising the step of:
 mapping between a user's unique ID for routing and communication device-specific addresses.

21. The method as claimed in claim 15, further including the step of opening a communications socket connection to enable exchange of conversation messages between caller and the callee communications devices.

22. The method as claimed in claim 21, wherein a call command includes one or more commands for initiating call transfer for switching a call from one communications device to another without disrupting a conversation flow.

23. The method as claimed in claim 21, wherein a call control command includes one or more commands for initiating sending of a one-way message to a callee communications device, said one-way message alerting a callee of a call prior to a step of routing the call to the callee, 24. The method as claimed in claim 15, wherein prior to the step of routing, a step of:
 notifying a user callee of a potential call via a communications device providing one-way communications.

25. A computer program device readable by a machine, tangibly embodying a program of instructions executable by a machine to perform method steps for context-aware unified communication between users over a common communications platform or heterogeneous communications platforms, said method comprising the steps of:
 a) generating call control commands for establishing a communications session between caller and callee communications devices over a single or heterogeneous communications platforms;
 b) routing conversation messages initiated by a caller between said caller and callee via respective caller and callee communications devices;
 c) monitoring dynamic context of a callee and obtaining callee's preferences for receiving communications, said routing of conversation messages being based on the callee's preferences or dynamic context information; and,
 d) enabling either caller or callee to migrate, based on a change in location of the caller or callee, a call that is ongoing to another communications device including at least to different modalities of communications without disrupting a flow of a conversation therebetween, the different modalities including at least audio and text, said migrating being performed without affecting other party of the call who is not migrating, whereby communication of conversation messages between caller and callee devices is enabled in accordance with the most appropriate communications device, the method further including the steps of:

enabling a user to specify a call routing preference and storing said user preferences, said routing step b) further including the step of accessing a preference for determining routing of messages to a preferred callee device;

enabling a user callee to specify reachability, wherein a call command indicates what devices that user may be reached at; and, enabling a user caller to receive notifications of a potential callee's availability to communicate and on what callee communications device.

26. A context-aware communication system for enabling communications between users over a common communications platform or heterogeneous communications platforms, said system comprising:

device agent means associated with a respective user communications device for generating commands for providing call control between user communications devices;

routing engine means for routing call commands between users via respective device agents to establish a communication session between user communications devices, and enabling exchange of conversation messages between said user communications devices including at least heterogeneous devices over said single or heterogeneous communications platforms;

means for monitoring dynamic context and detecting context changes of said user communications devices at least during a call between said user communications devices, the means for monitoring further for proactively prompting a user of said user communications devices to switch the call to another communications device based on the detected context change during the call; and means enabling said user to migrate, based on a change in location of the caller or callee, said call that is ongoing to said another communications device including at least to different modalities of communications without disrupting a flow of a conversation therebetween, the different modalities including at least audio and text, said migrating being performed without affecting other party of the call who is not migrating, wherein a callee is able to specify a call routing preference, said routing engine further including a storage means for storing user preferences, and further including means for accessing a preference for determining routing of conversation messages to a preferred callee device, and wherein said routing engine further includes:

registration means for enabling a user callee to specify reachability, wherein a call control command indicates what devices that a callee may be reached at; and, subscription means for enabling a user caller to receive notifications of a potential callee's availability to communicate and on what communications device.

27. The system of claim 26, further including:

transcoding means for converting data between different formats for to enable exchange of conversation messages between said user communications devices including at least heterogeneous devices over said heterogeneous communications platforms.

28. The system of claim 26, wherein the different modalities of communications include at least different types of media present in the communication and different interaction mechanism.

29. The system of claim 26, wherein the dynamic context includes at least instant messaging online status, activities and contact means derived from calendar entries, or desktop activities, or combinations thereof.

30. The system of claim 26, wherein the dynamic context includes at least a change in user location.

* * * * *